(12) United States Patent
Fukagawa et al.

(10) Patent No.: US 8,908,275 B2
(45) Date of Patent: Dec. 9, 2014

(54) OPTICAL PRODUCT AND SPECTACLE PLASTIC LENS

(71) Applicant: Tokai Optical Co., Ltd., Okazaki-Shi (JP)

(72) Inventors: Tsuyoshi Fukagawa, Okazaki (JP); Hirotoshi Takahashi, Okazaki (JP); Koji Yamamoto, Okazaki (JP)

(73) Assignee: Tokai Optical Co., Ltd., Okazaki-Shi (JP)

( * ) Notice: Subject to any disclaimer, the term of this patent is extended or adjusted under 35 U.S.C. 154(b) by 0 days.

(21) Appl. No.: 13/747,799

(22) Filed: Jan. 23, 2013

(65) Prior Publication Data

US 2013/0135742 A1    May 30, 2013

Related U.S. Application Data

(63) Continuation of application No. PCT/JP2011/066208, filed on Jul. 15, 2011.

(30) Foreign Application Priority Data

Aug. 20, 2010  (JP) .................. 2010-185515

(51) Int. Cl.
*G02B 1/10* (2006.01)
*G02B 5/28* (2006.01)
*G02B 1/11* (2006.01)
*G02B 1/04* (2006.01)

(52) U.S. Cl.
CPC ............... *G02B 1/115* (2013.01); *G02B 5/285* (2013.01); *G02B 1/11* (2013.01); *G02B 1/041* (2013.01)
USPC .......................................... 359/588; 359/581

(58) Field of Classification Search
CPC .......... G02B 1/11; G02B 1/115; G02B 5/285; G02C 7/10–7/108; G02C 7/02–7/028; G02C 7/04–7/049
USPC ......... 359/581, 586, 588, 599, 601, 642, 722, 359/723, 738; 351/44, 159.01, 159.49, 351/159.55, 159.57, 159.6, 159.62, 159.63, 351/159.64, 159.65, 159.73
See application file for complete search history.

(56) References Cited

U.S. PATENT DOCUMENTS 4,834,857 A * 5/1989 Gillery .................... 204/192.27
5,852,513 A * 12/1998 McDole et al. ............... 359/580

(Continued)

FOREIGN PATENT DOCUMENTS

CN    101512389 A    8/2009
EP    1 967 891       9/2008

(Continued)

OTHER PUBLICATIONS

International Search Report dated Oct. 11, 2011.

(Continued)

*Primary Examiner* — Stephone B Allen
*Assistant Examiner* — Kimberly N Kakalec
(74) *Attorney, Agent, or Firm* — Burr & Brown, PLLC

(57) ABSTRACT

An optical product includes an optical multilayer film on an optical product base. A color of reflected light of the optical multilayer film satisfies both of the following conditions in a chromaticity diagram (x,y,Y) of a CIE color system: [1] $0.27 \leq x \leq 0.30$ and [2] $0.30 \leq y \leq 0.36$. The optical product base is a spectacle plastic lens base.

3 Claims, 3 Drawing Sheets

(56) References Cited

U.S. PATENT DOCUMENTS

| | | | |
|---|---|---|---|
| 2001/0004300 A1* | 6/2001 | Tanaka et al. | 359/580 |
| 2003/0193719 A1* | 10/2003 | Mitsuishi et al. | 359/581 |
| 2008/0002260 A1* | 1/2008 | Arrouy et al. | 359/586 |
| 2009/0219620 A1 | 9/2009 | Yamada et al. | |
| 2011/0033681 A1 | 2/2011 | Adachi et al. | |
| 2011/0188125 A1* | 8/2011 | Takenaka et al. | 359/634 |

FOREIGN PATENT DOCUMENTS

| | | |
|---|---|---|
| EP | 2 199 835 | 6/2010 |
| EP | 2 275 843 | 1/2011 |
| JP | 2003-098312 A1 | 4/2003 |
| JP | 2004-077989 A1 | 3/2004 |
| JP | 2005-107209 A1 | 4/2005 |
| JP | 2006-126233 A1 | 5/2006 |
| JP | 2009-230121 A1 | 10/2009 |
| WO | 2007/077641 | 7/2007 |
| WO | 2009/133833 A1 | 11/2009 |

OTHER PUBLICATIONS

Japanese Office Action, Japanese Application No. 2010-185515, dated Feb. 28, 2014 (4 pages).

"Features of OptiLayer Software Family," Website Article, http://www.optilayer.com/features, dated Apr. 21, 2010 (6 pages).

"What's New in OptiLayer in 2010 (major updates, version 8.18," Website Article, http://www.optilayer.com/whats_new, dated Oct. 5, 2010 (30 pages).

European Search Report, European Application No. 11818015.7, dated Dec. 13, 2013 (7 pages).

Chinese Office Action (Application No. 201180036489.2) dated Jun. 5, 2014 (English translation of front page of Office Action only).

* cited by examiner

●...COMPARATIVE EXAMPLE 1
▲...COMPARATIVE EXAMPLE 2
★...EXAMPLE 1

● ... EXAMPLE 2
★ ... EXAMPL 3
▲ ... COMPARATIVE EXAMPLE 3

FIG. 1E

| CIE CHROMATICITY VALUES | x | y | Y |
|---|---|---|---|
| COMPARATIVE EXAMPLE 1 | 0.25 | 0.44 | 0.62 |
| COMPARATIVE EXAMPLE 2 | 0.29 | 0.35 | 0.42 |
| EXAMPLE 1 | 0.28 | 0.35 | 0.33 |
| EXAMPLE 2 | 0.28 | 0.34 | 0.29 |
| EXAMPLE 3 | 0.29 | 0.35 | 0.31 |
| COMPARATIVE EXAMPLE 3 | 0.3 | 0.42 | 0.93 |

OPTICAL PRODUCT AND SPECTACLE PLASTIC LENS

This application claims the entire benefit of Japanese Patent Application Number 2010-185515 filed on Aug. 20, 2010 and international Patent Application PCT/JP2011/066,208 filed on Jul. 15, 2011, the entirety of which is incorporated by reference.

BACKGROUND OF INVENTION

1. Field of the Invention

The present invention relates to optical products such as a camera lens and spectacle plastic lenses.

2. Description of Related Art

In plastic optical products, an optical multilayer film as an antireflection film is formed on the surface in order to reduce light reflection from the surface. Such an optical multilayer film is formed by alternately stacking several low refractive index and high refractive index layers, and an antireflection film having W-shaped spectral distribution of reflectance with a local maximum point at around 520 nm is commonly used in view of processing stability and appearance. Thus, upon incidence of light on the optical product having the optical multilayer film, a light green reflected image is seen when the optical product is viewed from the light incidence side (this phenomenon can also be seen in spectacle plastic lenses).

In order to make such a reflected image more faint and inconspicuous, the antireflection film needs to be designed to further reduce reflectance in a visible region in view of the cost. However, Japanese Patent Application Publication No. 2006-126233 (JP 2006-126233 A) shown below discloses design of an antireflection film having a seven-layer structure in which reflectance of light having an incident angle of 0 degrees is 1.0% or less in the wavelength range of 420 to 720 nm, although this design is produced in order to reduce reflections.

However, in the antireflection film of Japanese Patent Application Publication No. 2006-126233 (JP 2006-126233 A) as well, reflectance has a local maximum point of about 1% at around 580 nm (see reference number 21 in FIG. 2 of JP2006126233), and a light green reflected image is seen. Although the level of light transmittance and the degree to which reflection of outside light is reduced are relatively satisfactorily improved, the reflected color is still conspicuous.

SUMMARY OF THE INVENTION

It is an object of the present invention to provide an optical product which has high visible light transmittance and has sufficiently reduced reflectance, and whose reflected light is very inconspicuous.

In order to achieve the above object, the present invention provides an optical product comprising an optical multilayer film on an optical product base, characterized in that a color of reflected light of the optical multilayer film satisfies both of the following conditions in a chromaticity diagram (x,y,Y) of a CIE color system:

$$0.27 \leq x \leq 0.30, \quad [1]$$

and $$0.30 \leq y \leq 0.36. \quad [2]$$

In order to achieve an object to make the reflected light more inconspicuous in addition to the above object, the present invention is further characterized in that the reflectance is always 1 percent or less in a wavelength range from 400 nanometers to 700 nanometers, both inclusive, and Y is 1 percent or less.

In order to achieve an object to provide in a relatively simple manner an optical product whose reflected light is inconspicuous in addition to the above object, the present invention is further characterized in that the optical multilayer film has a total of seven layers, the optical multilayer film has a total of seven layers, in which the first layer is counted from an optical product base side, and odd layers are low refractive index layers and even layers are high refractive index layers, and the low refractive index layers are each comprised of silicon dioxide, in that an optical film thickness of the fourth layer of the optical multilayer film is in a range from $0.189\lambda$ to $0.295\lambda$, both inclusive, where $\lambda$ is a design wavelength (470 to 530 nm), in that a total physical film thickness of the fourth and fifth layers of the optical multilayer film is in a range from 63 nanometers to 69 nanometers, both inclusive, or in that each of the high refractive index layers is titanium oxide.

In order to achieve an object to provide a spectacle plastic lens belonging to such an optical product whose reflected light is very inconspicuous and which has great appearance, the present invention also relates to a spectacle plastic lens characterized in that the spectacle plastic lens is included in the above invention, and the optical product base is a spectacle plastic lens base.

According to the present invention, a slight amount of reflected light reflected from the antireflective surface of the optical multilayer film satisfies the following conditions of [1] $0.27 \leq x \leq 0.30$ and [2] $0.30 \leq y \leq 0.36$ in the chromaticity diagram (x,y,Y) of the CIE color system. Thus, saturation of the reflected light is very low as compared to conventional reflected light, and reflected light that is less colored, namely close to neutral, can be obtained. The reflected light having a low attention value, namely being inconspicuous, can be obtained.

BRIEF DESCRIPTION OF THE DRAWINGS

FIG. 1E is a table showing the positions of reflected light on the chromaticity diagram of the CIE color system in Examples 1 to 3 and Comparative Examples 1 to 3.

DETAILED DESCRIPTION OF THE INVENTION

Figure 1A:
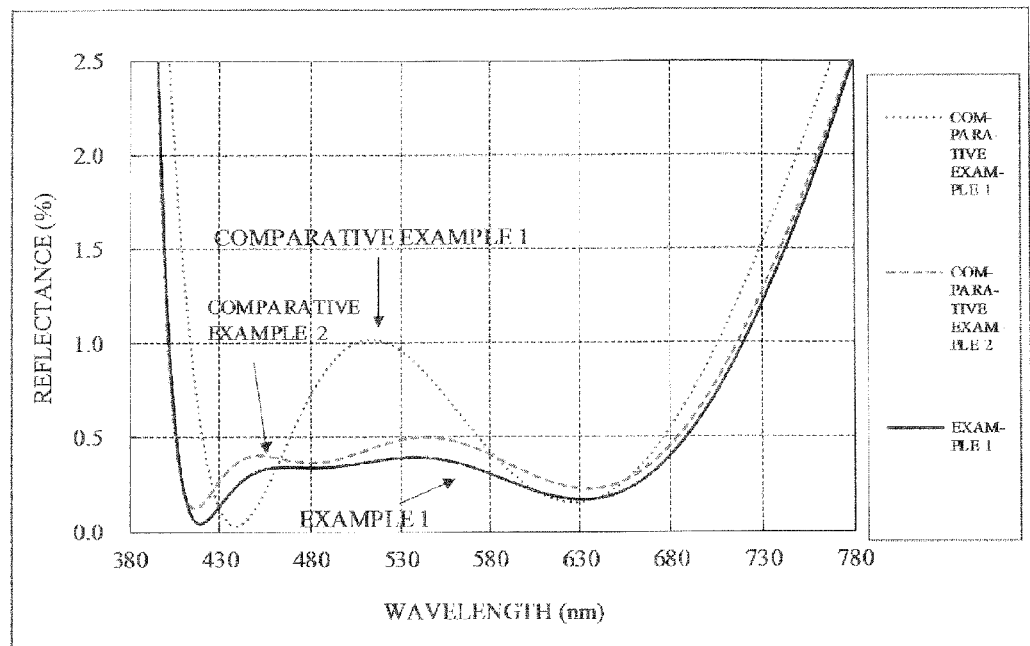
FIG. 1A is a graph showing spectral reflectance characteristics of Example 1 and Comparative Examples 1 and 2.

An embodiment of the present invention will be described below. Embodiments of the present invention are not limited to the embodiment shown below.

An optical lens as an example of an optical product of the present invention has a hard coating film and an optical multilayer in this order from a lens base on the surface of the lens base. The film configuration may be changed so that a primer layer is formed between the lens base surface and the hard coating film, an antifouling film is formed on the surface of the optical multilayer film, an intermediate layer is provided between the lens base surface and the hard coating film, between the hard coating film and the optical multilayer film, between the optical multilayer film and the antifouling film, etc., and that the hard coating film is omitted, etc. The hard coating film, the optical multilayer film, etc. may be formed on the back surface of the lens base or on both front and back surfaces of the lens base. The antifouling film is preferably comprised of a silane compound having a perfluoropolyether group.

Examples of the material (base material) of the lens base include a polyurethane resin, an episulfide resin, a polycarbonate resin, a polyester resin, an acrylic resin, a polyether sulfone resin, a poly(4-methylpentene-1) resin, a diethylene glycol bis(allyl carbonate) resin. A preferred example having a high refractive index is a polyurethane resin that is obtained by addition polymerization of a polyisocyanate compound with a polythiol and/or a sulfur-containing polyol, and a preferred example having a higher refractive index is an episulfide resin obtained by addition polymerization of an episulfide group, a polythiol, and/or a sulfur-containing polyol.

The hard coating film is formed by uniformly applying a hard coating solution to the lens base. For example, an organosiloxane resin containing inorganic oxide particles is used as the material of the hard coating film. In this case, the hard coating solution is prepared by primarily dispersing (mixing) an organosiloxane resin and an inorganic oxide particle sol in water or an alcohol solvent.

An organosiloxane resin obtained by hydrolyzing and condensing an alkoxysilane is preferred as the organosiloxane resin. Specific examples of the alkoxysilane include γ-glycidoxypropyltrimethoxysilane, γ-glycidoxypropyltriethoxysilane, methyl trimethoxysilane, and ethyl silicate. The hydrolysis condensates of these alkoxysilanes are manufactured by hydrolyzing the alkoxysilane compounds or combinations thereof by an acidic aqueous solution such as hydrochloric acid.

Specific examples of the inorganic oxide particles include a sol of zinc oxide, silicon dioxide, aluminum oxide, titanium oxide, zirconium oxide, tin oxide, beryllium oxide, antimony oxide, tungsten oxide, or cerium oxide, or mixed crystals of two or more of the sols. The particle size of the inorganic oxide particles is preferably 1 to 100 nanometers (nm) and more preferably 1 to 50 nm in order to ensure transparency of the hard coating film. Preferably, the inorganic oxide particles are contained in an amount of 40 to 60 wt % of the hard coating component in order to ensure appropriate levels of hardness and toughness of the hard coating film.

In addition, the hard coating solution may contain an acetylacetone metal salt, an ethylenediaminetetraacetic acid metal salt, etc. as a curing catalyst, and may further contain a surfactant, a colorant, a solvent, etc. as necessary for adjustment.

The thickness of the hard coating film is preferably 0.5 to 4.0 micrometers (μm), and more preferably 1.0 to 3.0 μm. If the thickness of the hard coating film is thinner than the lower limit of the thickness, namely 0.5 μm, sufficient hardness cannot be obtained. Further, the thickness of the hard coating film is thicker than the upper limit, namely 4.0 μm the possibility of problems about physical properties such as cracking and brittleness may be increased.

The optical multilayer film is formed by alternately stacking a low refractive index layer and a high refractive index layer by a vacuum deposition method, a sputtering method, etc. An inorganic oxide is used for each of the low refractive index layer and the high refractive index layer. Examples of the inorganic oxide include silicon oxide, titanium oxide having a higher refractive index than silicon oxide, zirconium oxide, aluminum oxide, yttrium oxide, tantalum oxide, hafnium oxide, tin oxide, niobium oxide, cerium oxide, and indium oxide. Substoichiometrie titanium oxide (TiOx, x<2, and x is close to 2) can be used, and an ITO film can be used in at least one layer.

The optical multilayer film is designed as an antireflection film, and has the following characteristics. That is, the color of reflected light slightly reflected from the optical multilayer film is very inconspicuous, with x being in the range of 0.27 to 0.30 and y being in the range of 0.30 to 0.36 in a chromaticity diagram (x,y,Y) of a CIE color system. The reflectance is 1% or less and the luminous reflectance Y is 1% or less in a visible wavelength range of 400 to 700 nm.

<<Overview>>

As described below, Examples 1 to 3 were produced which belong to optical products according to the present invention. Comparative Examples 1 to 3 that do not belong to the present invention were also produced in order to compare with Examples 1 to 3. Measurement of spectral reflectance characteristics in a visible region, measurement of reflected light still reflected even though reflection was prevented on the chromaticity diagram (x,y,Y) of the CIE color system, evaluation of heat resistance, sweat resistance, saline solution resistance, and moisture resistance performances, etc. were carried out for each of Examples 1 to 3 and Comparative Examples 1 to 3.

<<Configuration>>

Lens bases of Examples 1 to 3 and Comparative Examples 1 to 3 are flat lenses made of plastic, and a polyurethane resin having a refractive index of 1.60 was used for each of Examples 1 to 3 and Comparative Examples 1 to 3. These lens bases can be used as spectacle plastic lens bases, and had a standard size of spectacle plastic lenses.

Various antireflection films were formed on the surfaces of these lens bases. Each of the antireflection films was an optical multilayer film having a seven-layer structure of L1 to L7 layers from a lens base side, in which odd layers were comprised of silicon dioxide (low refractive index material) and even layers were comprised of titanium dioxide (high refractive index material). The L1 to L7 layers were sequentially vapor deposited so as to have optical film thicknesses as shown in Tables 1 to 6 shown below. Tables 1 to 3 show the optical film thickness, etc. of each layer in Examples 1 to 3, respectively, and Tables 4 to 6 show the optical film thickness, etc. of each layer in Comparative Examples 1 to 3, respectively. Although the design wavelength (center wavelength) λ is mainly 500 nm in the following description, the design wavelength can be changed as desired in the range of 470 to 530 nm.

TABLE 1

<Example 1>

| Layer | Deposition Material | Optical Film Thickness | Total Physical Film Thickness of L4 and L5 (nm) |
|---|---|---|---|
| L1 | SiO2 | 0.064λ | 64.15 |
| L2 | TiO2 | 0.079λ | |
| L3 | SiO2 | 0.112λ | |
| L4 | TiO2 | 0.203λ | |
| L5 | SiO2 | 0.063λ | |
| L6 | TiO2 | 0.174λ | |
| L7 | SiO2 | 0.284λ | |

TABLE 2

<Example 2>

| Layer | Deposition Material | Optical Film Thickness | Total Physical Film Thickness of L4 and L5 (nm) |
|---|---|---|---|
| L1 | SiO2 | 0.042λ | 65.82 |
| L2 | TiO2 | 0.083λ | |
| L3 | SiO2 | 0.093λ | |
| L4 | TiO2 | 0.250λ | |
| L5 | SiO2 | 0.039λ | |
| L6 | TiO2 | 0.186λ | |
| L7 | SiO2 | 0.270λ | |

TABLE 3

<Example 3>

| Layer | Deposition Material | Optical Film Thickness | Total Physical Film Thickness of L4 and L5 (nm) |
|---|---|---|---|
| L1 | SiO2 | 0.039λ | 68.45 |
| L2 | TiO2 | 0.083λ | |
| L3 | SiO2 | 0.090λ | |
| L4 | TiO2 | 0.274λ | |
| L5 | SiO2 | 0.032λ | |
| L6 | TiO2 | 0.188λ | |
| L7 | SiO2 | 0.267λ | |

TABLE 4

<Comparative Example 1>

| Layer | Deposition Material | Optical Film Thickness | Total Physical Film Thickness of L4 and L5 (nm) |
|---|---|---|---|
| L1 | SiO2 | 0.025λ | 54.82 |
| L2 | TiO2 | 0.062λ | |
| L3 | SiO2 | 0.074λ | |
| L4 | TiO2 | 0.132λ | |
| L5 | SiO2 | 0.080λ | |
| L6 | TiO2 | 0.128λ | |
| L7 | SiO2 | 0.291λ | |

TABLE 5

<Comparative Example 2>

| Layer | Deposition Material | Optical Film Thickness | Total Physical Film Thickness of L4 and L5 (nm) |
|---|---|---|---|
| L1 | SiO2 | 0.106λ | 65.06 |
| L2 | TiO2 | 0.068λ | |
| L3 | SiO2 | 0.146λ | |
| L4 | TiO2 | 0.155λ | |
| L5 | SiO2 | 0.095λ | |
| L6 | TiO2 | 0.151λ | |
| L7 | SiO2 | 0.298λ | |

TABLE 6

<Comparative Example 3>

| Layer | Deposition Material | Optical Film Thickness | Total Physical Film Thickness of L4 and L5 (nm) |
|---|---|---|---|
| L1 | SiO2 | 0.027λ | 71.24 |
| L2 | TiO2 | 0.072λ | |

TABLE 6-continued

<Comparative Example 3>

| Layer | Deposition Material | Optical Film Thickness | Total Physical Film Thickness of L4 and L5 (nm) |
|---|---|---|---|
| L3 | SiO2 | 0.079λ | |
| L4 | TiO2 | 0.297λ | |
| L5 | SiO2 | 0.025λ | |
| L6 | TiO2 | 0.199λ | |
| L7 | SiO2 | 0.247λ | |

<<Spectral Reflectance Characteristics and Chromaticity Diagram (x,y,Y) of Reflected Light in Color System>>

Figure 1B:
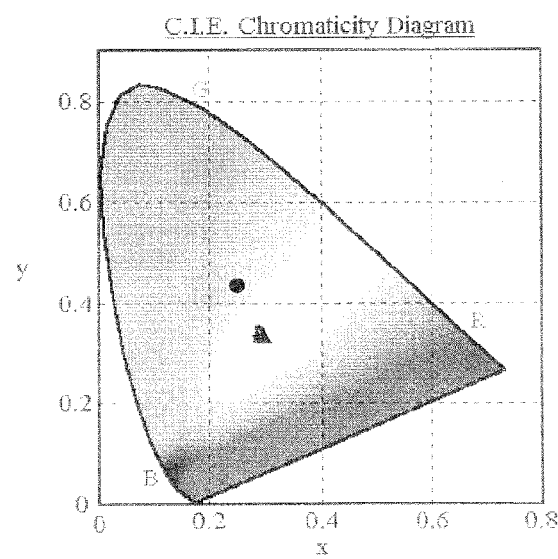
FIG. 1B is a chromaticity diagram of a CM color system, showing the positions of reflected light in Example 1 and Comparative Examples 1 and 2.
Figure 1C:
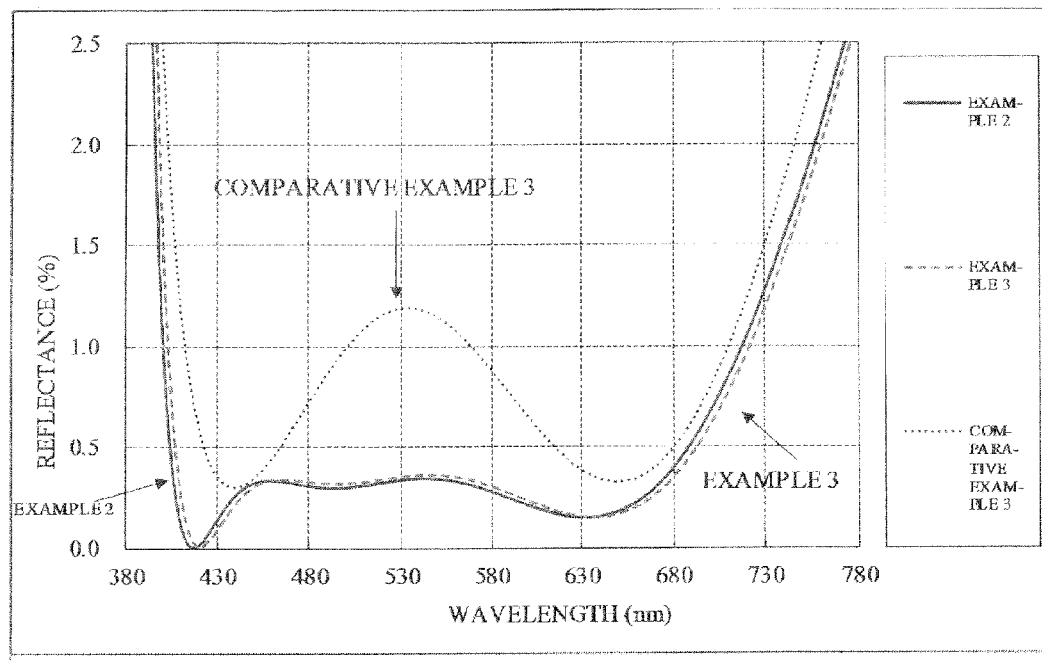
FIG. 1C is a graph showing spectral reflectance characteristics of Examples 2 and 3 and Comparative Example 3.
Figure 1D:
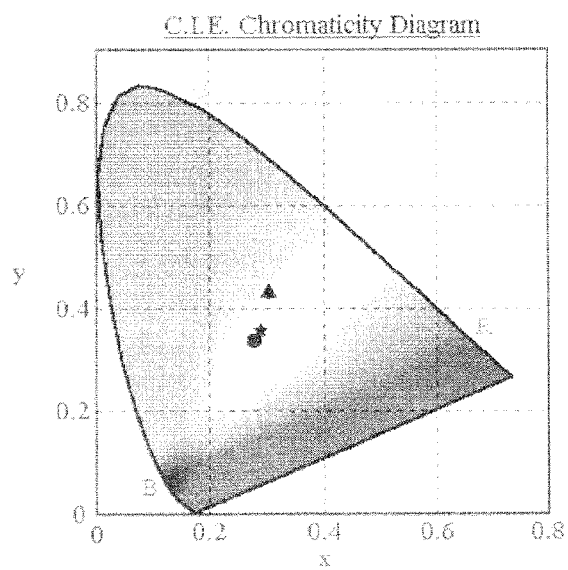
FIG. 1D is a chromaticity diagram of the CIE color system, showing the positions of reflected light in Examples 2 and 3 and Comparative Example 3.

FIG. 1A is a graph showing spectral reflectance characteristics of Example 1 and Comparative Examples 1 and 2. FIG. 1B is a chromaticity diagram of the CIE color system, showing the positions of reflected light in Example 1 and Comparative Examples 1 and 2. FIG. 1C is a graph showing spectral reflectance characteristics of Examples 2 and 3 and Comparative Example 3. FIG. 1D is a chromaticity diagram of the CIE color system, showing the positions of reflected light in Examples 2 and 3 and Comparative Example 3. FIG. 1F is a table showing the positions of reflected light on the chromaticity diagram of the CIE color system in Examples 1 to 3 and Comparative Examples 1 to 3.

The spectral reflectance was measured on one side of the lens by using a lens spectral reflectometer (USPM-RU made by OLYMPUS CORPORATION). Each chromaticity coordinate value is calculated as an object color by spectrocolorimetry from the spectral reflectance by using a D65 light source as a light source and a viewing angle of 2 degrees.

Example 1 (optical film thickness of L4 layer: 0.203λ) has almost the same reflectance distribution as Example 2. In Example 1, (x,y)=(0.28, 0.35), and thus saturation is very low as compared to conventional examples. Moreover, Example 1 has very low luminous reflectance Y of 0.33. It should be noted that in this example and the remaining examples described below, λ=500 nm unless otherwise specified.

In Comparative Example 2 (optical film thickness of L4 layer: 0.155λ), the reflectance in the visible region is higher than Example 2 by about 0.1 to 0.2 points, but is still 0.5% or less, and thus there is almost no reflection in Comparative Example 2. In Comparative Example 2, (x,y)=(0.29, 0.35), and thus saturation of reflected light is very low as compared to the conventional examples. Moreover, Comparative Example 2 has luminous reflectance Y of 0.42, which is slightly higher than Examples 1 to 3.

Then, Comparative Example 1 (optical film thickness of L4 layer: 0.132λ) has a reflectance distribution having a mountain shape in the range of 440 to 620 nm with a peak (about 1.0%) near 510 nm, and having a portion with reflectance higher than 1% in the visible region (on the side shorter than 410 nm). In Comparative Example 1, (x,y)=(0.25, 0.44), and thus reflected light is slightly blue green. Moreover, Comparative Example 1 has luminous reflectance Y of 0.62, which is about 2 times as high as Examples 1 to 3.

On the other hand, in Example 2 (optical film thickness of L4 layer: 0.250λ) the reflectance is as low as about 0.4% in the range of 450 to 600 nm and decreases on both sides thereof. Thus, Example 2 has reflectance of 1% or less in the visible wavelength range of 400 to 700 nm. In Example 2, (x,y)= (0.28, 0.34), and thus saturation is very low (0.27≤x≤0.30, 0.30≤y≤0.36). Moreover, Example 2 has very low luminous reflectance Y of 0.29 (Y≤1.0[%]).

Example 3 (optical film thickness of L4 layer: 0.274λ) has almost the same reflectance distribution as Example 2. In Example 3, (x,y)=(0.29, 0.35) and thus saturation is very low. Moreover, Example 3 has very low luminous reflectance Y of 0.31.

Then, Comparative Example 3 (optical film thickness of L4 layer: 0.297λ) has a reflectance distribution having a mountain shape in the range of 440 to 650 nm with a peak (about 1.2%) near 530 nm, having the lowest reflectivity of about 0.3%, and having a portion with reflectance higher than 1% in the visible region (in the range of 500 to 560 nm, on the side shorter than 410 nm). In Comparative Example 3, (x,y)=(0.3, 0.42), and thus reflected light is slightly yellow green. Moreover, Comparative Example 3 has luminous reflectance Y of 0.93, which is much higher than Examples 1 to 3.

<<Adhesion Performance>>

Adhesion performance of the lenses of Examples 1 to 3 and Comparative Examples 1 to 3 was evaluated by a method described below, and the evaluation result is shown in the upper row of Table 7.

TABLE 7

| Performance | Comparative Example 1 | Comparative Example 2 | Example 1 | Example 2 | Example 3 | Comparative Example 3 |
|---|---|---|---|---|---|---|
| Adhesion | Δ-x | x | ○ | ○ | ○ | x |
| Boiling in City Water | ○ | ○ | ○ | ○ | ○ | ○ |
| Artificial Sweat | ○ | ○ | ○ | ○ | ○ | ○ |
| Boiling in Saline | ○ | ○ | ○ | ○ | ○ | ○ |
| Constant Temperature and Humidity | ○ | ○ | ○ | ○ | ○ | ○ |

In the adhesion performance evaluation, cuts in a 1×1 millimeter (mm) grid pattern were made in the surfaces of the antireflection films of two lenses to form 100 squares of 1 square millimeter ($min^2$). Then, a cellulose adhesive tape (made by NICHIBAN Co., LTD.) was attached thereto and was quickly removed while one end of the tape was held to examine the delamination state of the antireflection film in the grid pattern.

The row of "Adhesion" in Table 7 shows the examination result using a total of ten lenses. Two of the ten lenses were the ones immediately after formation, the remaining lenses are the ones after a weathering test for 60, 120, 180, and 240 hours (two lenses each) by a weathering test instrument using an ultraviolet carbon arc lamp as a light source (made by Suga Test Instruments Co., Ltd.). In this row, "Δ" means that delamination occurred in at least one square of the grid pattern in any of the lenses, "x" means that delamination occurred in three or more squares of the grid pattern in any of the lenses, and "○" means that no delamination occurred in any of the lenses.

Regarding the adhesion performance, delamination occurred to a large extent in Comparative Examples 2 and 3, and delamination occurred even in Comparative Example 1. However, no delamination occurred in Examples 1 to 3. This result shows that Examples 1 to 3 have satisfactory adhesion performance.

<<Boiling Resistance>>

City water in an amount enough to immerse the lenses therein was heated to boiling in a beaker, and the lenses were immersed in the boiling city water for 10 minutes. Then, occurrence of delamination was examined. The examination result is shown in the row of "Boiling in City Water" in Table 7. In this row, "○" means that no delamination occurred, and "x" means that delamination occurred.

In the boiling test, no delamination occurred in any of Comparative Examples 1 to 3 and Examples 1 to 3 in the extreme environment described above.

<<Sweat Resistance>>

Each lens was immersed in an alkaline artificial sweat solution, and was left to soak for 24 hours in an environment kept at 20° C. Then, the lens was removed from the solution. After the lens was rinsed with water, the surface was examined for any change. The alkaline artificial sweat solution was prepared by placing 10 g of sodium chloride, 2.5 g of dibasic sodium phosphate 12-hydrate, and 4.0 g of ammonium carbonate in a beaker, and dissolves them in 1 liter of pure water. The examination result is shown in the row of "Artificial Sweat" in Table 7 in the same manner as that of the boiling performance.

In the artificial sweat test, no delamination occurred in any of Comparative Examples 1 to 3 and Examples 1 to 3 in the harsh environment described above.

<<Salt Resistance>>

A similar boiling test to the above boiling test, except for replacing the city water with saline solution at a concentration of 4.5 wt %, was conducted. The first boiling time was 10 minutes, and each lens was repeatedly boiled four times. The examination result is shown in the row of "Boiling in Saline" in Table 7 in a manner similar to that of the city water boiling performance.

In the salt water boiling test as well, no delamination occurred in any of Comparative Examples 1 to 3 and Examples 1 to 3.

<<Moisture Resistance>>

A constant temperature/humidity test was conducted to examine any change of the lens by leaving the lens for 1 day, 3 days, and 7 days in total in an environment of 60° C. and 95%. Each lens was left for another 7 days, and an adhesion test was conducted in a manner similar to that described above to evaluate heat resistance and moisture resistance. As shown in the row of "Constant Temperature and Humidity" in a manner similar to that of the city water boiling performance, each lens maintained its initial performance.

<<Overall Evaluation>>

The above results show that Comparative Examples 2 and 3 are insufficient, Comparative Example 1 is somewhat insufficient, and Examples 1 to 3 are sufficient in terms of the performance (in particular, adhesion performance). On the other hand, Comparative Examples 1 and 3 are unsatisfactory, and Comparative Example 2 and Example 1 to 3 are satisfactory in terms of the optical characteristics that the reflectance of incident light or transmitted light is very low (1% or less) and saturation of reflected light is very low. Accordingly, the lenses that are high in the various performances and satisfactory in terms of the optical characteristics are Examples 1 to 3.

In Examples 1 to 3, the color of reflected light is (x,y)= (0.28, 0.35), (0.28, 0.34), and (0.29, 0.35) in the chromaticity diagram of the CIE color system, respectively, which satisfies both conditions of [1] $0.27 \leq x \leq 0.30$ and [2] $0.30 \leq y \leq 0.36$.

Thus, saturation is very low, and a slight amount of reflected light is hardly recognized. Accordingly, the reflected light is hardly conspicuous, and the lenses of Examples 1 to 3 have great appearance with the influence of the reflected light being suppressed. On the other hand, Comparative Examples 1 and 3 do not satisfy the above conditions [1] and [2]. Thus, reflected light is slightly colored, and thus is recognizable, and the lenses of Comparative Examples 1 and 3 have the influence of the reflected light.

In Examples 1 to 3, the reflectance is always 1% or less in the wavelength range from 400 nm to 700 nm, both inclusive, and the value Y (luminous reflectance) is also 1% or less (0.33, 0.29, and 0.31%, respectively). Thus, the energy of reflected light of incident light is very low, and thus the reflected light is further inconspicuous.

Moreover, in Examples 1 to 3, the optical film thickness of the fourth layer of the optical multilayer film is in the range from $0.203\lambda$ to $0.274\lambda$, both inclusive ($0.203\lambda$, $0.250\lambda$, and $0.274\lambda$, respectively). Accordingly, the lens which has antireflection performance and whose reflected light is very inconspicuous can be configured in a relatively simple manner. Simulation was repeatedly conducted at various design wavelengths $\lambda$ in the range of 470 to 530 nm. The simulation result shows that the lens whose reflected light is very inconspicuous can be configured if the optical film thickness of the fourth layer of the optical multilayer film is in the range of $0.189\lambda$ to $0.295\lambda$.

Since the total physical film thickness of the fourth and fifth layers is in the range from 63 nm and 69 nm, both inclusive (64.15, 65.82, and 68.45 nm, respectively), the lens which has antireflection performance and whose reflected light is very inconspicuous can be configured in a relatively simple manner. The optical film thickness of the fourth layer of Comparative Examples 1 to 3 is $0.132\lambda$, $0.155\lambda$, and $0.297\lambda$, respectively, and the total physical thickness of the fourth and fifth layers of Comparative Examples 1 to 3 is 54.82 nm, 65.06 nm, and 71.24 nm, respectively (Comparative Example 2 has satisfactory optical performance, but does not have satisfactory adhesion performance).

What is claimed is:

1. An optical product comprising:
an optical multilayer film on an optical product base, the optical multilayer film consisting of a total of seven layers, in which the first layer is counted from an optical product base side, and odd layers are low refractive index layers and even layers are high refractive index layers;
wherein the low refractive index layers each comprise silicon dioxide and wherein each of the high refractive index layers is titanium oxide;
wherein a color of reflected light of the optical multilayer film satisfies both of the following conditions in a chromaticity diagram (x, y, Y) of a CIE color system:

$$0.27 \leq x \leq 0.30, \qquad [1]$$

and $$0.30 \leq y \leq 0.36; \qquad [2]$$

and
wherein the reflectance is always 1 percent or less in a wavelength range from 400 nanometers to 700 nanometers, both inclusive, and Y is 1 percent or less;
wherein an optical film thickness of the fourth layer of the optical multilayer film is in a range from $0.189\lambda$ to $0.295\lambda$, both inclusive, where $\lambda$ is a design wavelength of 470 to 530 nm; and
wherein a total physical film thickness of the fourth and fifth layers of the optical multilayer film is in a range from 63 nanometers to 69 nanometers, both inclusive.

2. The optical product according to claim 1, wherein a total physical film thickness of the fourth and fifth layers of the optical multilayer film is in a range from 63 nanometers to 69 nanometers, both inclusive.

3. A spectacle plastic lens, wherein the spectacle plastic lens is included in the optical product according to claim 1, and the optical product base is a spectacle plastic lens base.

* * * * *